United States Patent
Huang et al.

(10) Patent No.: US 10,733,252 B2
(45) Date of Patent: Aug. 4, 2020

(54) EXPANDING ACTIVITY CHANNELS IN AN ONLINE NETWORK

(71) Applicant: Microsoft Technology Licensing, LLC, Redmond, WA (US)

(72) Inventors: Shen Huang, San Jose, CA (US); Hu Wang, San Jose, CA (US); Zhou Jin, Sunnyvale, CA (US); Yongzheng Zhang, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 204 days.

(21) Appl. No.: 16/024,755

(22) Filed: Jun. 30, 2018

(65) Prior Publication Data

US 2020/0004887 A1 Jan. 2, 2020

(51) Int. Cl.
| | |
|---|---|
| *G06F 16/00* | (2019.01) |
| *G06F 16/9535* | (2019.01) |
| *H04L 29/06* | (2006.01) |
| *H04L 29/08* | (2006.01) |
| *G06F 16/248* | (2019.01) |
| *G06F 16/2457* | (2019.01) |

(52) U.S. Cl.
CPC ........ *G06F 16/9535* (2019.01); *G06F 16/248* (2019.01); *G06F 16/24578* (2019.01); *H04L 67/306* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2003/0204581 | A1* | 10/2003 | Adar ..................... | H04L 67/104 709/223 |
| 2015/0310059 | A1* | 10/2015 | Assam .................. | G06Q 50/01 707/748 |
| 2015/0319262 | A1* | 11/2015 | Xiao ....................... | H04L 51/32 709/206 |
| 2016/0127010 | A1* | 5/2016 | Rho ....................... | G06Q 50/20 375/257 |
| 2016/0219402 | A1* | 7/2016 | Zimerman .............. | H04W 4/60 |
| 2017/0308556 | A1* | 10/2017 | Gonzales-Brenes, Jr. .................... | H04L 43/00 |

* cited by examiner

*Primary Examiner* — Son T Hoang
(74) *Attorney, Agent, or Firm* — Hickman Palermo Becker Bingham LLP; Daniel D. Ledesma

(57) ABSTRACT

In one technique, one or more search criteria associated with a first user are determined. Based on the one or more search criteria, a search of a first set of users is performed. As a result of the search, a subset of the first set of users is identified. A second set of users that have responded to messages from users in the subset is identified. Instances of attribute values of an attribute of the second set of users are aggregated to generate aggregated values, each of which corresponds to a different attribute value of the attribute values. Based on one or more of the aggregated values, content that is related to one or more attribute values that correspond to the one or more aggregated values is determined and presented to the first user.

20 Claims, 4 Drawing Sheets

EXPANDING ACTIVITY CHANNELS IN AN ONLINE NETWORK

TECHNICAL FIELD

The present disclosure relates generally to collaborative filtering and, more particularly to, expanding an activity channel in an online network.

BACKGROUND

In collaborative filtering, interests of a user are predicted by collecting preferences or interest information from many similar users. For example, user A is interested in items A and C and user B is interested in item A, B, C, and D. If it is determined that user A and B are similar (e.g., through their respective profiles or through their common interests in items A and C), then it can be presumed that user A might be interested in other items that user B likes, such as items B and D in this example. Thus, items B and D may be recommended to user A according to the collaborative filtering model.

In this collaborative filtering model, only one kind of "interest" relationship exists, i.e., in only one direction. However, in other domains, such as where items represent people, the relationship is bi-directional. Focusing on a one-way relation in generating recommendations is unlikely to yield positive results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for implementing bi-directional collaborative filtering in expanding activity channels in an online system. The activity of users that are similar to a channel expanding user is coupled with the activity of users that the similar users targeted to expand an activity channel of the channel expanding user. In one technique, the activity of similar users includes an identification of target users to which the similar users sent messages and the activity of the target users includes responses to those messages. Given a subset of the target users, a profile of the target users in that subset is generated and used to present data to the channel expanding user to expand the activity channel of that user. In this way, a new user to the online system is not required to have any online history before being presented with relevant information. Also, even an experienced user of the online system may see where there is current potential demand and pursue that course.

Thus, embodiments described herein improve computer processes to discover relevant information through the use of specific rules to uncover one or more attributes of target users that a particular user can leverage. These embodiments improve an existing technological process for identifying relevant information rather than merely using a computer as a tool to perform an existing process. Embodiments define a specify way to discover relevant information, namely considering online activity of target users with respect to similar users of a channel expanding user, to solve the problem of identifying relevant information for the channel expanding user.

System Overview

Figure 1:
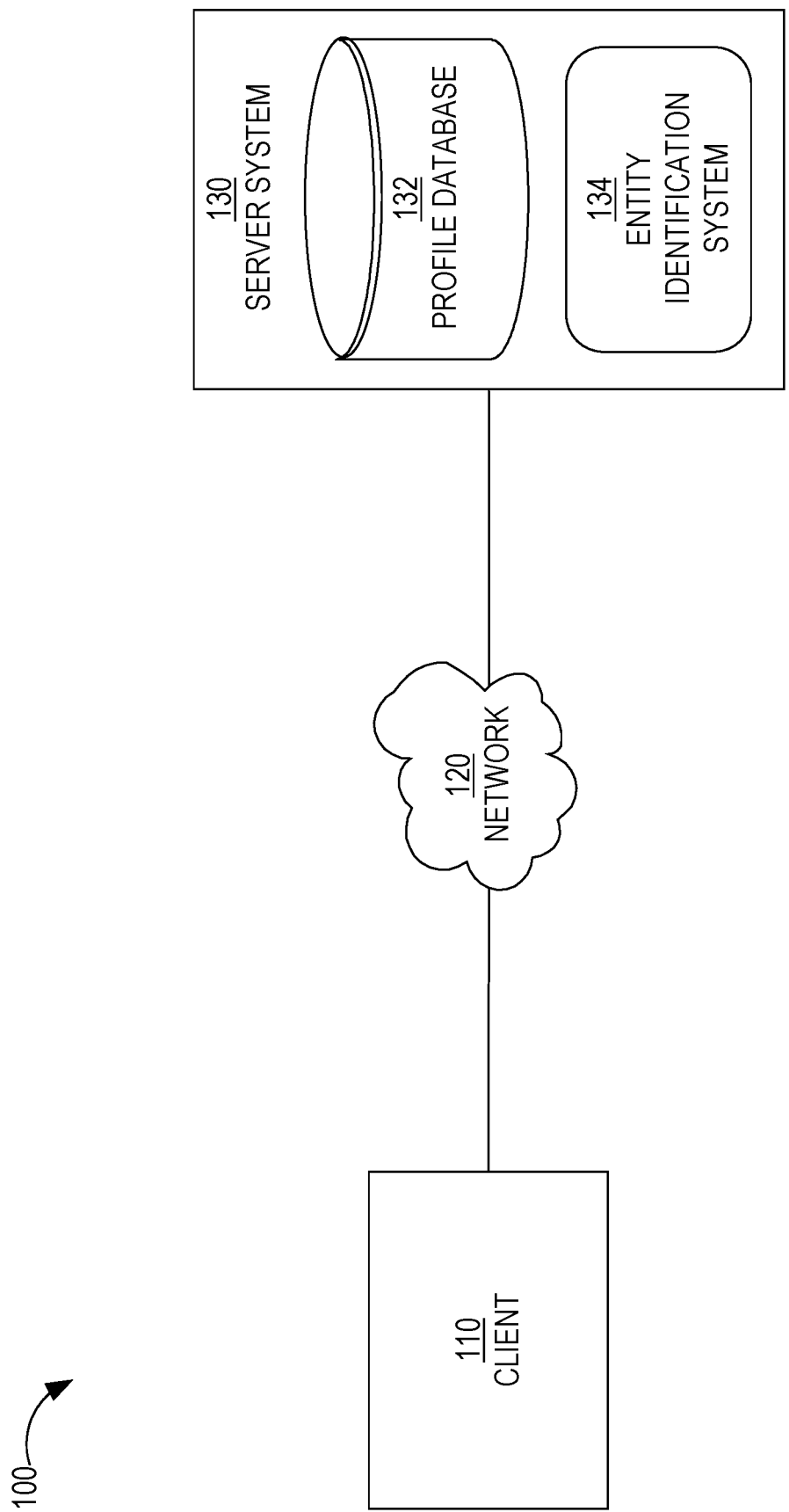
FIG. 1 is a block diagram that depicts an example system, in an embodiment.

FIG. 1 is a block diagram that depicts an example system 100, in an embodiment. System 100 includes client 110, network 120, and server system 130.

Client 110 is an application or computing device that is configured to communicate with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server system 130 over network 120. Another example of an application is a web application that is downloaded from server system 130 and that executes within a web browser executing on a computing device. Client 110 may be implemented in hardware, software, or a combination of hardware and software. Although only a single client 110 is depicted, system 100 may include multiple clients that interact with server system 130 over network 120.

Through client 110, a user is able to provide input that includes profile information about the user. Later, the user may interact with server system 130 to retrieve, supplement, and/or update the profile information.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Server System

As depicted in FIG. 1, server system 130 includes a profile database 132 and an entity identification system 134. Server system 130 may provide a web service (not depicted), such as a social networking service. Examples of social networking service include Facebook, LinkedIn, and Google+. Although depicted as a single element, server system 130 may comprise multiple computing elements and devices, connected in a local network or distributed regionally or globally across many networks, such as the Internet. Thus, server system 130 may comprise multiple computing elements other than profile database 132 and entity identification system 134.

Profile Database

In an embodiment, profile database 132 comprises multiple entity profiles, each provided by and corresponding to a different entity. An entity may be an individual, a group of individuals, an organization, a group of organizations, or any combination thereof. Examples of organizations include companies, sole proprietorships, charities, academic institutions, government agencies, and various interest groups. If an entity is not an individual, then a representative of the entity provides profile data to server system 130 to be stored in profile database 132. Each entity profile may be stored in association with credential data (e.g., username and password) that is required to update the entity profile.

A profile for an individual may include a first name, last name, an email address, residence information (e.g., country, state, city), a mailing address, a phone number, one or more educational institutions attended, one or more current and/or previous employers, one or more current and/or previous job titles, a seniority level, an industry, a list of skills, a list of endorsements, and/or names or identities of friends, contacts, connections of the individual, and derived data that is based on online actions that the individual has performed. Examples of such actions include jobs to which the user has applied, views of job postings, views of company pages, private messages between the user and other users in the user's social network, and public messages that the user posted and that are visible to users outside of the user's social network.

A profile for an organization may include a name, a size of the organization (e.g., number of employees), contact information, address information of each office of the organization, job postings, and descriptions of types of work in which the organization engages.

Some data within an entity's profile (e.g., work history) may be provided by the entity (or a representative thereof) while other data within the entity's profile (e.g., skills and endorsement) may be provided by a third party, such as a "friend" or connection of the entity or a colleague of the entity.

Server system 130 may prompt entities to provide profile information in one of a number of ways. For example, server system 130 may have provided a web page with a text field for one or more of the above-referenced types of information. In response to receiving profile information from an entity's device, server system 130 stores the information in an account that is associated with the user and that is associated with credential data that is used to authenticate the entity to server system 130 when the entity (or a representative thereof) attempts to log into server system 130 at a later time. Each text string provided by an entity may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with an entity's account. Access data indicates which users, groups, or devices can access or view the entity's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in an entity profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Entity Identification System

Figure 2:
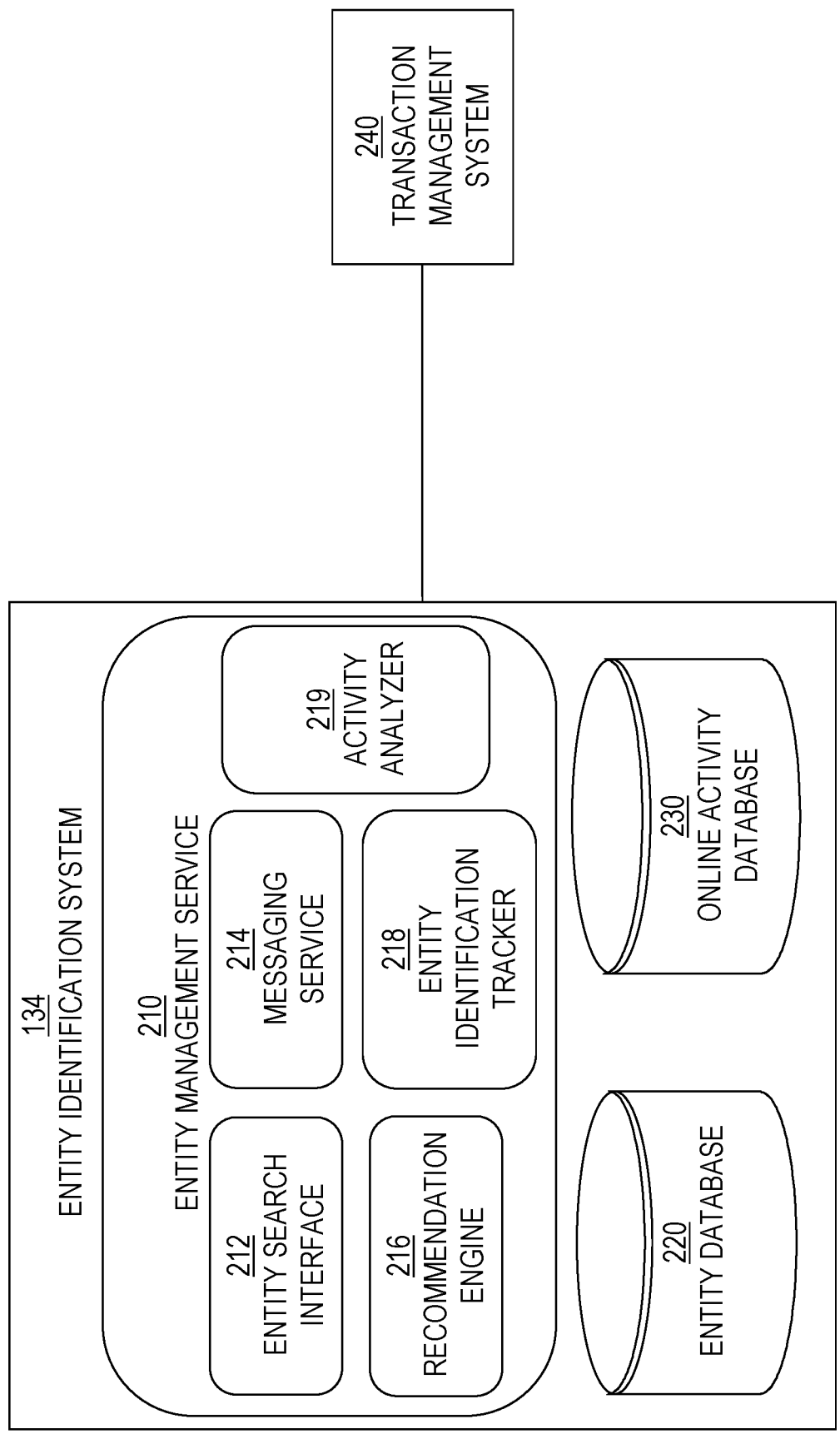
FIG. 2 is a block diagram that depicts components of an entity identification system, in an embodiment.

FIG. 2 is a block diagram that depicts components of entity identification system 134, in an embodiment. Entity identification system 134 includes an entity management service 210, an entity database 220, and an online activity database 230. Entity management service 210 may be implemented in software, hardware, or any combination of software and hardware. Although entity management service 210 is depicted as including certain features, all embodiments are not limited to requiring these features and some embodiments may include additional features not described herein.

Entity management service 210 may be implemented as a web application, a portion of which operates in entity identification system 134 and another portion of which operates in a web browser executing on a client device. Thus, the web browser transmits a HTTP request over a network (e.g., the Internet) in response to user input (e.g., entering of text and selection of a graphical button) that is received through a user interface provided by the web application and displayed through the web browser. Entity management service 210 receives the input, performs one or more operations, and returns one or more results in an HTTP response that the web browser receives and processes. Instead of a web browser approach, a client-side application is installed and executes on a client device and is configured to communicate with entity management service 210 over a network. An example of entity management service 210 is Sales Navigator™, provided by LinkedIn.

Users of entity management service 210 may be considered provider agents. A "provider agent" is a user that is an agent of a provider of one or more products and services. A provider agent researches organizations (or "accounts") and/or individuals within organizations to identify potential customers (or "leads") that might purchase the one or more products/services. An example of a provider agent is a salesperson. A provider may employ multiple provider agents who are responsible for pursuing different leads or accounts.

A goal of provider agents is to offer (or sell) one or more products/services to target users (e.g., leads). While offering a product/service to target users that are connected to the first user in an online social network might have the best chance of success, the target users are not necessarily connected to the provider agent.

Components of Entity Management Service

As noted previously, entity management service 210 includes multiple features that a user of the service might leverage. For example, entity management service 210 includes entity search interface 212 that allows users to search for information about entities stored in entity database 220. Example search criteria for searching individuals include name of individual, industry, job title, academic institution attended, academic degree earned, level of schooling (e.g., high school graduate, some college, PhD, etc.), geographic area (e.g., city and state), name of current employer, job function, seniority level, number of years in current job position, number of years at current employer, skills, name of previous employer. Example search criteria for searching organizations include name of organization, industry, geographic area, size of organization (e.g., number of employees), and recent profit or revenue (e.g., Q4 revenue from SEC filings or other public sources).

In an embodiment, entity management service 210 includes an interface that allows a user (or representative of a third-party organization) to select one or more preferences. Such preferences may be selected upon the user's registration (or the third-party organization's registration) with entity identification system 134 and/or some time later after registration and use of entity identification system 134. Entity management service 210 uses the selected preferences to automatically perform searches for the user. Additionally or alternatively, entity management service 210 uses the selected preferences to automatically select corresponding search preferences when searching for leads or accounts. Thus, the user does not have to select the same search preferences each time the user wants to search for relevant leads or accounts.

Entity management service 210 includes a messaging service 214 that includes an interface that allows users to create and send messages to individuals (leads). A message may be an email message that is transmitted to an email account of the individual, a text message that is transmitted over a cellular network to a mobile device (e.g., smartphone) of the individual, or an application message that is transmitted to the individual's account that is maintained by the same party or entity that operates entity identification system 134. An example of messaging service 214 is LinkedIn's InMail™.

Entity management service 210 includes a recommendation engine 216 that identifies entities with which a user of service 210 might be interested. Recommendation engine 216 may determine potential entities of interest for a user based on one or more factors, such as past searches that the user initiated through entity search interface 212, explicit criteria or interests that the user selected, and identities of past entity identities that the user selected/saved. For example, is a user of entity management service 210 saved an identity for entity A, recommendation engine 216 may determine that entity B is similar in one or more ways to entity A and, as a result of the determination, present information about entity B to the user. As another example, upon registration with entity management service 210, a user selects criteria of entities that the user is interested in, such as job title, organization size, and years of experience. In response, recommendation engine 216 performs a search (e.g., periodically, such as daily) and presents identities of entities to the user. As another example, recommendation engine 216 records a search that a user initiates through entity search interface 212 and causes the search to be performed automatically (i.e., not in response to user input) sometime later, such as the day after the search is performed. Recommendation engine 216 compares the results of the initial search with the results of the subsequent search to determine any differences. If an entity did not appear in the results of the initial search but appears in the results of the subsequent search, then recommendation engine 216 causes an identity of that entity to be presented to the user.

Entity database 220 may include information about individuals and organizations, such as companies, charities, non-profit organizations, government agencies, alumni groups, etc. Entity database 220 may be a copy or a superset of profile database 132. The information may have been submitted by the individuals and by representatives of the organizations directly and/or may have been derived based on other data sources, such as online activity of the individuals and third-party data sources regarding the organizations. For example, a user may register with a social network service and provide personal information (in a digital profile of the user) in exchange for the ability to virtually connect with other users of the social network service and take advantage of features provided by the social network service, such as the ability to view company profiles and other users' profiles. As a similar example, a representative of an organization may register with the social network service and provide information about the organization (in a digital profile of the organization) so that users of the social network service can learn about the organization, can follow the organization, and/or subscribe to messages issued by (and/or about) the organization.

Entity database 220 may be accessible to multiple users of entity identification system 200. Different users may be associated with different privileges that allow those users to access certain information stored in entity database 220.

Entity identification system 134 may include or be affiliated with a transaction management system 240 that stores information about individuals (or contacts), organizations (or accounts), and opportunities (or deals). An "opportunity" is a combination of one or more individuals (or contacts), one or more organizations (or accounts), and one or more products or services that are being sold to the one or more individuals as representatives of the one or more organizations (typically, a single organization per opportunity).

An example of transaction management system 240 is a customer relationship management (CRM) database system. Transaction management system 240 may be remote relative to entity identification system 134, but may be accessible to entity identification system 134 such that entity identification system 134 can store information into transaction management system 240 and/or retrieve data from transaction management system 240 through, for example, one or more application programming interface (API) calls.

"Transaction" may refer to an actual or prospective business transaction involving one or more entities and one or more representatives of each entity. Transaction management system 240 allows representatives of an organization that is selling or marketing one or more products or services to keep track of which individuals and accounts are of interest with respect to selling a particular product or service. For example, a contact record for an individual in transaction management system 240 may include a first name, last name, job title, an employer name, an email address, a date of first contact with the individual, a date of most recent contact with the individual, a notes field indicating what was discussed in the latest electronic or verbal exchange with the individual, a product name or service name in which the individual may be interested, and a sales stage. As another example, an account record for an organization (e.g., a company) may include an organization name, a geographic location, a mailing address, a phone number, a list of principals at the organization, and a list of products/services that are being marketed or sold to this organization.

Entity management service 210 may include a sync feature that allows information about individuals and organizations to be automatically saved to transaction management system 240 in a single user selection. Such a sync feature may be presented as a selectable graphical icon that is adjacent to: a search result corresponding to an entity; a message from an individual; or a recommendation corresponding to an entity.

An individual that has an associated contact record in transaction management system 240 may be associated with (as indicated in the contact record) one of multiple stages with respect to an (sales) opportunity, such as a prospect stage, an opportunity stage, and a customer stage. An individual in a prospect stage is one that is not yet a customer and has less than a certain number of contacts with a sales representative (e.g., two). An individual in an opportunity stage is one that is not yet a customer but that has exhibited interest in a certain product/service and/or has more than a certain number of contacts with a sales representative (e.g., three). If an individual is associated with multiple opportunities (and, thus, multiple products/services) simultaneously, then the individual may be associated with multiple stages simultaneously, but with respect to different opportunities.

If the entity that operates entity identification system 134 contracts with third-party users or organizations who seek access to entity database 220, then entity identification system 134 may be affiliated with multiple transaction management systems, each corresponding to a different organization that sells or markets a product or service. Each third-party user or organization (hereinafter simply "third-party organization") is associated with a contract that specifies a number of seats for the third-party organization. A "seat" may correspond to a unique login for an individual affiliated with (e.g., employed by) the third-party organization. Thus, ten different representatives of the third-party organization may have their own login to entity identification system 200 and be able to access entity database 220 through entity search interface 212. Also, each seat may be associated with its own history of actions that a corresponding representative initiated with respect to entity management service 210 (or, as a more specific example, entity search interface 212). Examples of actions that may be individually tracked include social network actions (e.g., comment, like, share) by the corresponding representative (or seat holder), messages that the corresponding representative sent and/or received along with identities of the recipients/senders of the messages, a number of searches by the seat holder, the search criteria of each search, search results identified based on each search, tags pertaining to seat holders, and any data that the corresponding seat holder supplied, such as notes pertaining to an entity, entities that the seat holder selected for saving, and sales preferences.

Entity Identification Tracker

Entity management service 210 includes entity identification tracker 218, which stores, in online activity database 230, data that includes identities of entities with which a user (e.g., a representative of a third-party organization or seat holder) has interacted in some way, whether actively or passively. For example, a user might send, to a particular entity, an electronic message through entity management service 210. If the particular entity responds to the message, then the user selects a graphical icon that causes entity identification tracker 218 to save an identifier of the particular entity for the user. The identifier is stored in a set of saved entity identifiers. In a related example, if the particular entity responds to the message, then receipt of the response triggers entity identification tracker 218 to store the identifier in the set of saved entity identifiers. In a related example, the initial message addressed to the particular entity is sufficient to cause entity identification tracker 218 to store the identifier of the particular entity in the set.

As another example, a user of entity management service 210 initiates a search through entity search interface 212. In response to the search, entity search interface 212 identifies results that include identities (e.g., names) of multiple entities and those identities are presented on a screen of a computing device operated by the user. The entities may be individuals and/or organizations. The user may select a graphical icon adjacent to one or more of the identities, which causes entity identification tracker 218 to store the corresponding entity identifier(s) in the set of saved entity identifiers. Alternatively, the user may select another graphical icon that causes entity identification tracker 218 to store, in the set of saved entity identifiers, entity identifiers of all entities in the search results. In this way, a user is not required to individually select entity identities.

Online Activity Database

As noted above, online activity database 230 stores information about multiple users of entity management service 210 and/or their respective online activities. Some of the data in online activity database 230 may be supplemented with data from profile database 132. Thus, a user record in online activity database may correspond to a particular profile in profile database 132. The user record may include a profile identifier that uniquely identifies the particular profile and/or the particular profile may include a record identifier that uniquely identifies the user record. Once the correspondence is established, a job title associated with a particular user of entity management service 210 is automatically retrieved from profile database 132 and stored in a corresponding user record in online activity database 230.

Bi-Directional Collaborative Filtering Model

According to embodiments described herein, multiple directions are considered in identifying relevant information for a channel expanding user. A "channel expanding user" is a user of entity management service 210 that desires for his/her channel to be expanded. A "channel" refers to a set of users that may be relevant for the channel expanding user to target or reach out to. The desire to expand one's channel may be inferred by virtue of utilizing entity management service 210. Initially, when users first use entity management service 210, their respective channels are essentially empty. Even experienced users of entity management service 210 would be interested in expanding their respective channels.

In the collaborative filtering model, only one kind of "interest" relationship exists, i.e., in only one direction. However, in the context of offering products and services, the relationship is bi-directional. For example, a salesperson offers "supply" and a buyer offers "demand." A one-way relation is unlikely to make a transaction successful. A new model is needed to effectively characterize such relations, and a bi-directional collaborative filtering model is a feasible solution.

Example Process

Figure 3:
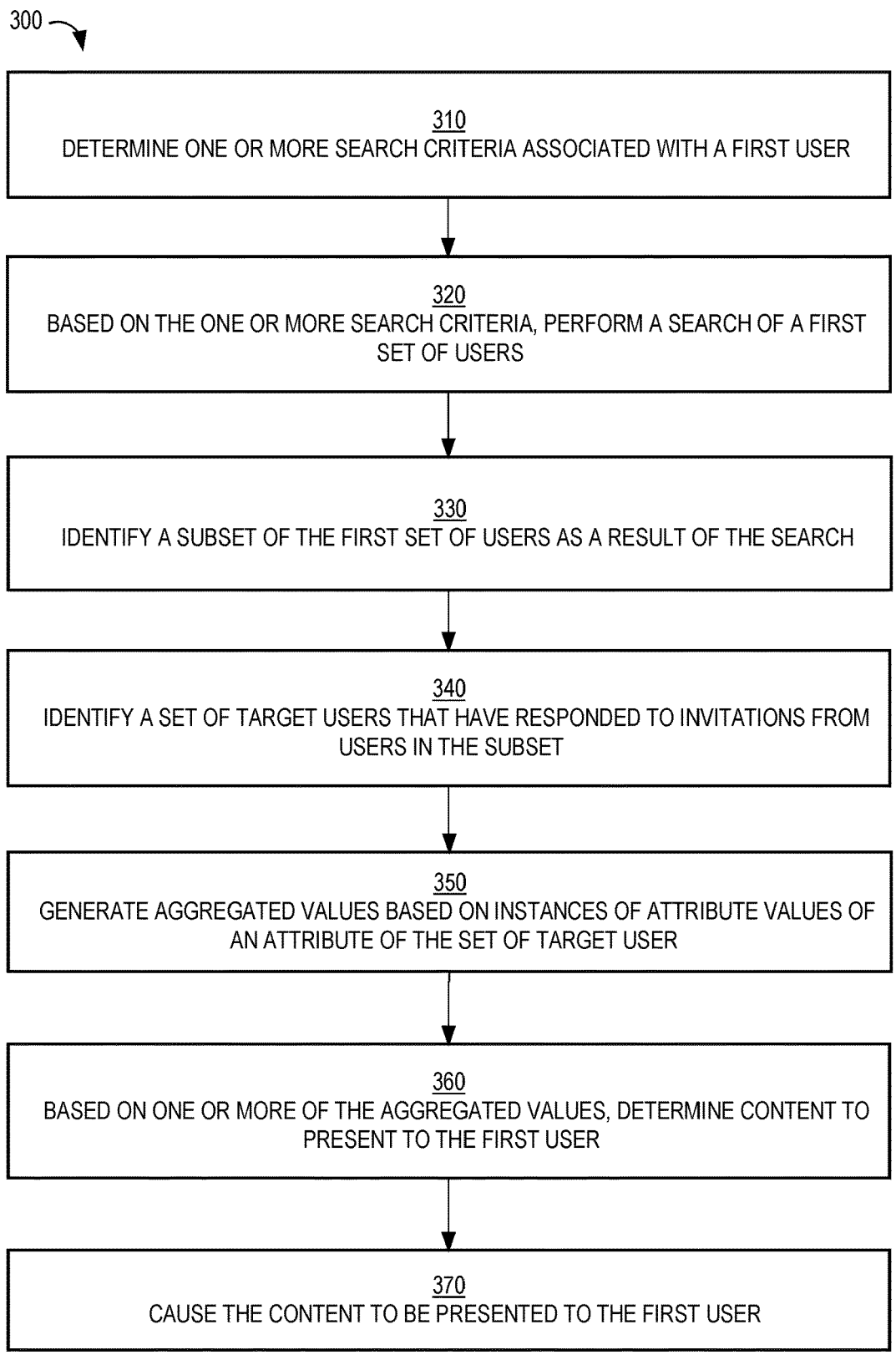
FIG. 3 is a flow diagram that depicts an example process for identifying content to display to a user, in an embodiment.

FIG. 3 is a flow diagram that depicts a process 300 for expanding an activity channel for a user, in an embodiment. Process 300 may be performed by one or more components of entity identification system 134, such as activity analyzer 219.

At block 310, one or more search criteria associated with a first user are determined. The search criteria may be specified by the first user (e.g., one or more keywords) or may be inferred based on data about the first user (e.g., a job title of the first user).

At block 320, based on the one or more search criteria, a search of a first set of users is performed. The first set of users does not include the first user. The first set of users are users of entity management service 210.

At block 330, as a result of the search, a subset of the first set of users is identified.

At block 340, a set of target users that have responded to messages from users in the subset is identified. Information about the set f target users may be stored in online activity database 230.

At block 350, one or more aggregated values of an attribute value of an attribute of the set of target users are generated.

At block 360, based on one or more of the aggregated values, content to present to the first user is determined. The content may be in the form of a recommendation.

At block 370, the content is caused to be presented to the first user. For example, the content is transmitted over a computer network (e.g., network 120) to a computing device (e.g., client 110) of the first user. Block 370 may be performed in response to receiving a request from the computing device of the first user or without having received such a request. For example, the content may be transmitted as a notification to (a) a software application executing on a smartphone of the first user or (b) a web application executing within a web browser on a desktop computer of the first user.

Search for Relevant Users of Entity Management Service

In block 310, the search for relevant (e.g., similar) users of entity management service 210 may be performed in one of multiple ways. In one approach, the one or more search criteria associated with the first user (of FIG. 3) is input that the first user entered (e.g., into a search field of a graphical user interface). The one or more search criteria is then compared with profile data associated with users of entity management service 210. The users of entity management service 210 whose profile data matches the one or more search criteria become the subset in block 330.

In another approach, the one or more search criteria is determined from data about the first user. For example, block 310 may involve identifying one or more attributes of the first user, which attributes may be retrieved from a profile of the first user, which profile may be maintained by entity management service 210 or in profile database 132. Example attributes include a job title of the first user, seniority of the first user, industry of the first user, interests of the first user, and a role in the first user's organization (or current employer of the first user). The extracted attribute values of the first user are then compared to corresponding attribute values of users of entity management service 210. For example, block 320 may involve comparing the job title of the first user with job titles of users of entity management service 210. If there is a match between the first user and a user of entity management service 210, then that user becomes a member of the subset in block 330.

Attributes of a user of entity management service 210 may completely match or partially match attribute of the first user and/or one or more search criteria specified by the first user. How well a user matches the first user may be reflected in a match score. A full match (where all search criteria match attributes of a user) may be represented with the highest match score possible, such as ten. Alternatively, the number of search criteria associated with a first user that match attributes of a user becomes a match score. For example, if there are four search criteria, then the maximum match score for the search is 6.

Information about users of entity management service 210 against which the search is made (in block 320) may be stored in one of multiple ways. Embodiments are not limited to any particular storage technique or format. For example, information about users of entity management service 210 may be stored as a table, where each row of the table corresponds to a different user (of entity management service 210) and each column of the table corresponds to an attribute of a user. The users reflected in this information come from many different organizations and, optionally, many geographic regions.

Example attributes include a user identifier, job title of the user, company name of the user, region, a list of target regions, and seniority of the user. The region attribute indicates a region of the user whereas the list of target regions is a list of regions into which the user is offering one or more product/services. The seniority attribute indicates a seniority level of the user (e.g., a provider agent) of entity management service 210.

Information about users of entity management service 210 may include attributes that are not searched in block 320, but that are used to identify target users. Examples of sch attributes include a saved target user list, an invited list, a responded list, a not-yet-responded list, and a connected list. The saved target user list attribute is a list of target users (or leads) that the user has explicitly saved as a result of previous online searches that the user has initiated. The invited list is a list of target users (or leads) to which the user has caused an invitation to be sent. The responded list is a list of target users (or leads) that have responded to an invitation from the user. The not-yet-responded list is a list of users (or leads) that have not yet responded to an invitation from the user. The invited list may be derived from the responded list and the not-yet responded list and, thus, might be left out explicitly in the information about the set of users of entity management service 210.

The connected list is a list of zero or more target users who are connected with the user, for example, in an online social network. Alternatively, the connected list is a list of zero or more target users from the invited list who connected with the user in response to an invitation from the user. There may be some situations where a user was connected with a target user prior to using entity management service 210, in which case the target user would not show up in this latter version of the connected list.

Information about a set of users of entity management service 210 may be automatically extracted from different data sources. For example, some of the information (e.g., job title, seniority) is extracted from profile database 132 while other information (e.g., saved target user list, responded list) may be extracted from online activity database 230.

An invitation is an electronic message initiated by a user inviting the recipient (a target user) to perform one or more actions. Example actions include establishing or confirming a connection on an online social network, scheduling a time to meet or to discuss a proposal from the user, or expressing a desire to learn more about a proposal.

An invitation may be sent through messaging service 214 that may be part of an online social network, such as LinkedIn. The account from which the invitation is sent is associated with the user and the account that receives the invitation is associated with the target user.

Alternatively, an invitation may be sent by an electronic message (email) through a traditional email messaging service. The email may include code that, when processed by an email client, causes a message to be transmitted to server system 130, or an affiliated system. The message includes an email address of the sender (or a unique internal number associated with the email address) and an email address of the recipient (or a unique internal number associated with the email address). Thus, for example, if a sending user sends an email with the code to a target user and the target user's email client opens (or displays) the email, then a first message is generated and transmitted, notifying server system 130 that the target user has been invited by the sending user. If the target user causes a reply email to be sent and the sending user's email client opens (or displays) the reply email, then a second message is generated and transmitted, notifying server system 130 that the target user has responded to the sending user.

Engagement Score

In an embodiment, an engagement score is generated for each target user of an identified similar user of entity management service 210. The engagement score may be generated by activity analyzer 219. An engagement score reflects how engaged the corresponding target user is with the user of entity management service 210. An engagement score may also be considered a demand score that reflects the demand of a target user for a particular class of products/services. An engagement score is generated based on one or more factors, such as whether the target user has responded to an invitation from the similar user, whether an opportunity was opened with the target user, and whether the opportunity was closed lost or closed won. Such opportunity information may be stored in, and retrieved from, transaction management system 240.

A target user that has responded to an invitation from a sending user is more likely to enter a (e.g., business) relationship with the sending user than a target user that has not responded. Thus, a response from a target user is a signal that the target user is interested in the invitation or offer. However, not all responses might be positive for the sending user. For example, a response message from a target user might indicate that the target user is not interested in the invitation from the sending user.

In an embodiment, a type of response is determined for a response message to an invitation. The type of response indicates how positive (or how negative) the response message is to the invitation. For example, a messaging interface for responding to an invitation has user interface controls for responding without typing any text. For example, one UI control may be a button with a thumbs up image/icon that, when selected, causes a response message to indicate that the target user accepts the invitation. The response message may be populated with predefined text so that the target user does not have to enter any text. Another UI control may be a button with a thumbs down image/icon that, when selected, causes a response message to indicate that the target user declines the invitation or is otherwise not interested in the offer. In this way, content that a user manually inputs into a message is not leveraged.

In an embodiment, a number of response messages is a factor in weighing the responsiveness of a target user. For example, if a target user has responded to two different messages from a sending user, then the target user is presumed to have accepted the initial invitation or is at least interested in learning more about the invitation. Thus, the responses by the target user indicate that there might be legitimate demand for the product/service that the sending user is offering. The greater the number of responses from a target user, the greater the weighting with respect to attribute values of that target user. Conversely, the fewer responses from a target user, the lesser the weighting with respect to attribute values of that target user.

In an embodiment, a number of invitations from the user (of entity management service 210) is a factor in weighing the responsiveness of a target user. For example, if a target user responded to the first message from a sending user but did not respond to the next four messages/invitations form the sending user, then the target user may be presumed to be disinterested and will, therefore, have a lower weighting than a target user who has responded to an invitation from a sending user and the sending user has sent less than five total messages/invitations. In a related embodiment, the greater the number of invitations after the latest response (or no response) from a target user, the lower the weighting with respect to that target user. Conversely, the fewer the invitations after the latest response from a target user, the higher the weighting with respect to that target user.

In one example implementation, a target user that is associated with a closed won opportunity may have the highest possible weighting factor whereas a target user that has not responded to multiple invitations (e.g., from the same sending user) may have the lowest weighting factor (which may be zero or a negative value).

In an embodiment, the generated engagement scores are used to filter target users. For example, target users whose engagement scores are less than a threshold value are ignored in the next stage where attribute values of target users are considered. As another example, target users are ranked by their respective engagement scores and only the top N target users are considered in the next stage.

Attribute Values of Target Users

Once a set of target users are identified based on engagement scores, then attributes of those target users are identified for processing. This stage corresponds to block 350 in process 300 and may be performed by activity analyzer 219. Example attributes include industry, region, seniority, job title (including past job titles), and skills. Values for the attributes may be retrieved from profiles (e.g., from profile database 132) of the respective target users and aggregated. For example, if three target users have "Computer Networking" as an attribute value for the industry attribute in their respective profiles, then those three instances are aggregated to generate an aggregated value (e.g., a count) of three for that attribute value. Thus, each instance of the same attribute value among the relevant target users is aggregated to generate a single aggregated value for that attribute value.

In an embodiment, multiple attribute values of a single attribute are aggregated. For example, instances of the attribute value "Government Administration" for the industry attribute are aggregated as well as instances of the attribute value "Industrial Automation" for the industry attribute. Thus, as a result of the aggregations, a count for "Government Administration" and a count for "Industrial Automation" are generated and stored.

In a related embodiment, multiple attribute values of multiple attributes are aggregated. Continuing with the above example for the industry attribute, in addition to industry attribute values, instances of the attribute value "Entry-Level" for the seniority attribute are aggregated as well as instances of the attribute value "Manager" for the seniority attribute. Thus, as a result of the aggregations, a count for "Entry-Level" and a count for "Manager" are generated and stored.

Other example seniority levels include Training, Senior, Director, Vice President (VP), Chief X Officer (CxO), Partner, and Owner. These attribute values that are stored as part of user profiles may be specified by the respective user or may be automatically determined based on textual analysis of a user's profile, such as searching for certain keywords or combinations of words in any work experience entries and/or any job title entries in a user's profile.

In an embodiment, different target users are associated with different weighting factors. For example, some target users might have a weight of 1.5 while other target users might have a weight of 0.6. A weight for a target user may be based on the target user's engagement score, whether the target user has responded to a sending user, how often the target user has responded to the sending user, and/or whether the response(s) was/were positive, negative, or unknown. Then, those weights are factored in during aggregation. For example, a first target user has a weight of 1.5, a second target user has a weight of 1, and a third target user has a weight of 0.6 and each specified "Computer Technology" as the value for attribute "Industry." Thus, an aggregated value for "Computer Technology" may be the total of the three weights, or 3.1.

By aggregating instances of attribute values, online activity and attributes of individual users, particularly target users, are kept private.

Reports

In an embodiment, one or more reports on the aggregated data are generated and presented to the first user. A report is an example of the content that is determined in block 360 of process 300. A single report may provide information about multiple attributes or a single attribute. Thus, multiple reports may be generated, one for each attribute, if multiple attributes are tracked. Reports may be generated by activity analyzer 219.

A report includes data about one or more attributes of the identified target users. The data may be organized in a number of ways, such as a pie chart, a bar graph, a line graph, etc. For example, a pie chart may illustrate a number of instances of each of multiple attribute values for a particular attribute. As a specific example, if the particular attribute is geographic region and four different aggregated values for geographic region were calculated, then the pie chart would indicate four different sections, each section labeled with a different attribute value, such as Northeast, Southeast, Northwest, and Southwest. The size of each section corresponds to the aggregated value corresponding to each attribute value. Each section may also indicate the corresponding aggregated value, such as the aggregated value itself, a percentage, or both.

Recommendations

In an embodiment, one or more recommendations are automatically generated based on the aggregated data. Recommendations may be generated by activity analyzer 219. A recommendation is another example of the content that is determined in block 360 of process 300.

The one or more recommendations may be provided to the first user (in process 300) in one or more ways. For example, a recommendation is displayed on a home page of the first user after the first user logs into server system 130 or entity management service 210. As another example, a recommendation is included in an automatically generated message (e.g., an InMail message or an email) that is sent to an account of the first user. As another example, a recommendation may be pushed to an application (e.g., s smartphone application) executing on a computing device of the first user and the application generates a notification, whether audible, visual, and/or haptic.

A recommendation identifies an attribute (e.g., geographic region, industry, seniority) and one or more attribute values for the attribute. The recommendation may include multiple attribute values of a single attribute, a single attribute value for each attribute of multiple attributes (e.g., the top 1 attribute value of each attribute), or multiple attribute values for each attribute of multiple attributes (e.g., the top N attribute values of each attribute). In a related embodiment, if there are multiple attributes to recommend, then a different recommendation is generated for each attribute.

The first user may use a recommendation to perform subsequent online actions. For example, the first user uses a recommendation to know which accounts or potential leads on which to focus his/her search. For example, if a recommendation identified the American Southeast as a region to target, then the first user may search for organizations (e.g., companies) that are located in the American Southeast, along with one or more other search criteria, such as industry, number of employees, etc. As another example, if a recommendation identified the Director as a seniority level to target, then the first user may search for people that are associated with that seniority level, along with one or more other search criteria, such as geography, industry, etc.

In an embodiment, a recommendation is generated only for the top aggregated value for a particular attribute. For example, if there are eight instances of a first industry value, six instances of a second industry value, and three instances of a third industry value, then a recommendation is generated for the first industry value and not for the second industry value or the third industry value.

In a related embodiment, a recommendation is generated for the top N aggregated values for a particular attribute. N may be two or greater. Given the above example, if N is two, then a recommendation identifying the first and second industry values would be generated.

Threshold

In an embodiment, a recommendation is generated for an attribute value only if the corresponding aggregated value is greater than a particular threshold. For example, if the number of instances of an attribute value among a set of target users (identified in block 340) is more than ten, then a recommendation identifying that geographic region is generated and sent to the first user; otherwise, no recommendation identifying that attribute value is generated. A threshold may be based on actual instances of attribute values or may be based on a weighted aggregated value, such as 8.4, that takes into account how responsive each target user (identified in block 340) is.

In a related embodiment, a threshold depends on the number of target users (identified in block 340) or the total possible weighted value. An example threshold is 30%, meaning a particular attribute value needs to represent 30% or more of all attribute values of a particular attribute of the identified target users. Thus, if there are ten identified target users, then at least three of them need to have a particular attribute value in order for a recommendation identifying that particular attribute value to be generated. Or, the aggregated value for an attribute value must represent 30% or more of the total of aggregated values of all attribute values of the particular attribute.

In a related embodiment, different attributes have different thresholds. For example, for industry, the threshold is 25%, while for geography, the threshold is 35%.

Automatic Searches

In an embodiment, instead of, or in addition to, providing reports or recommendations, aggregated data is used to automatically perform a search. A result of the search is another example of the content that is determined in block 360 of process 300. For example, if the top attribute value for geographic region is the American Southwest, then an organization search is performed with that aggregated value. The search may also include one or more other search criteria. The other search criteria may be associated with the first user (in process 300). For example, the first user may have specified one or more other search criteria (a) when the first user initially registered with entity management service 210 or (b) in the most recent search that the first user initiated.

In an embodiment, the specific attribute dictates a type of search: a people search or an organization search. For example, if an attribute value is of the seniority level attribute, then the search is a people search where records (or profiles) of individuals are searched (e.g., in profile database 132) for a matching seniority level. As another example, if an attribute value is of the industry attribute, then the search is an organization search where records (or profiles) of organizations are searched (e.g., in profile database 132) for a matching industry. Some attributes may cause both types of searches. For example, if an attribute value is of the geography attribute, then a people search is performed where records (or profiles) of individuals are searched for a matching geography and then the identified records are filtered by records of organizations (that are listed in the identified individual profiles/records) that list the matching geography.

Recruiting Context

Examples of embodiments described herein are in the context of offers and sales. However, other contexts are also applicable where bi-directional relations can be determined. One of those contexts is the recruiting context. There, the first user is a recruiter (e.g., a new recruiter), the similar users that are identified are other recruiters, and the target users are candidates who are (or may be) looking for new employment opportunities. In this context, similar users to the first user may be determined based on industry (e.g., legal, tech, staff) while engagement or responsiveness from candidates to recruiters may be measured similarly as described above.

Improvement in Computer-Related Technology

Embodiments described herein reflect an improvement in computer-related technology. Embodiments are based on a bi-directional collaborative model that intelligently uncovers opportunities for (e.g., new) users of entity management service 210 in a new way while maintaining user privacy. Thus, embodiments are used to select particular relevant content, from among a virtually unlimited number of potential content options, to present to a channel expanding user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
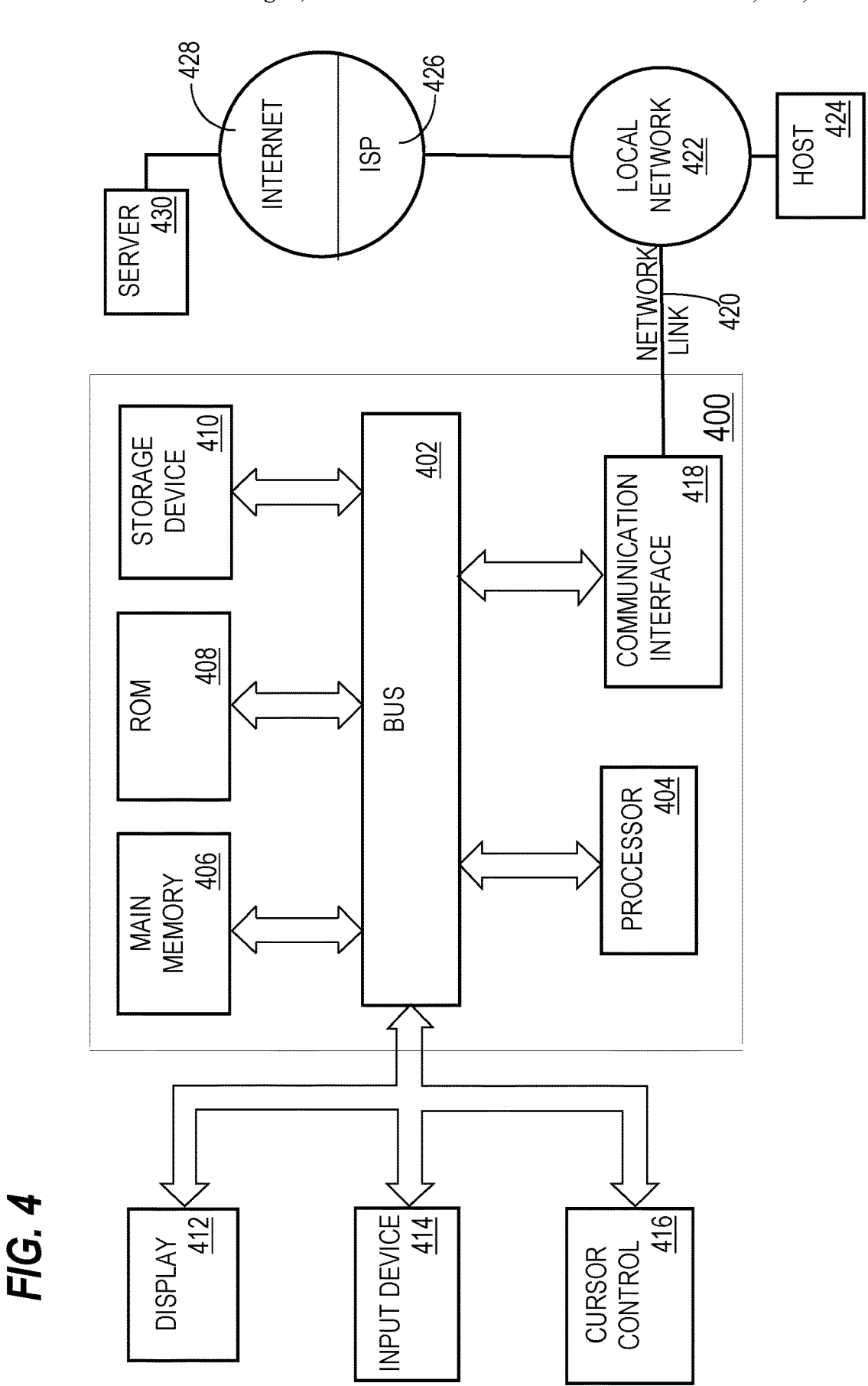
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining, by a computer system, one or more search criteria associated with a first user;
   based on the one or more search criteria, performing, by the computer system, a search of one or more first databases for a first plurality of users matching the one or more search criteria, wherein the first plurality of users do not include the first user;
   as a result of the search, identifying, by the computer system, a subset of the first plurality of users, wherein the subset has a number of users less than the first plurality of users;
   identifying, by the computer system and from one or more second databases, a second plurality of users that have responded to messages from at least some users in the subset;
   aggregating, by the computer system, instances of a plurality of attribute values of an attribute of the second plurality of users to generate a plurality of aggregated values, wherein each aggregated value in the plurality of aggregated values corresponds to a different attribute value of the plurality of attribute values;
   based on one or more aggregated values in the plurality of aggregated values, determining, by the computer system, content related to one or more attribute values that correspond to the one or more aggregated values to present to the first user; and
   causing, by the computer system, the content to be presented to the first user.

2. The method of claim 1, wherein the determining the content comprises:

performing a second search of entities based on the one or more attribute values:
identifying one or more entities that are associated with the one or more attribute values;
wherein the content comprises data about the one or more entities.

3. The method of claim 1, wherein the attribute of the second plurality of users is one of a geographic region, an industry, or a seniority level.

4. The method of claim 3, wherein the content comprises data about one or more particular geographic regions, one or more particular industries, or one or more particular seniority levels.

5. The method of claim 1, further comprising:
for each user in the first plurality of users, storing response data that indicates zero or more users that have responded to one or more first messages from the user and zero or more users that have not responded to one or more second messages from the user;
based on the response data, identifying a third plurality of users that have not responded to messages from at least some users in the subset;
aggregating second attribute values of the attribute of the third plurality of users to generate a second plurality of aggregated values;
wherein the content is also determined based on one or more aggregated values in the second plurality of aggregated values.

6. The method of claim 1, wherein the one or more search criteria are specified by the first user.

7. The method of claim 6, further comprising:
receiving, from a computing device of the first user, input that comprises one or more keywords;
wherein the performing the search comprises comparing the one or more keywords to data found in user profiles of the first plurality of users.

8. The method of claim 1, further comprising, prior to aggregating the instances of the plurality of attribute values:
identifying a third plurality of users that have received a message from a user in the sub set;
for each user of the third plurality of users, generating an engagement score that reflects how engaged the user is with the user in the subset;
based on the engagement score for each user of the third plurality of users, filtering the third plurality of users to generate the second plurality of users, wherein the second plurality of users is a subset of the third plurality of users.

9. The method of claim 1, further comprising, prior to the determining the content:
for each user of one or more users in the second plurality of users:
determining a weight for the user,
identifying an attribute value that is associated with the user,
generating a weighted instance of the attribute value based on the weight;
wherein at least one aggregated value in the plurality of aggregated values is based on the weighted instance.

10. One or more storage media storing instructions which, when executed by one or more processors, cause:
determining, by a computer system, one or more search criteria associated with a first user;
based on the one or more search criteria, performing, by the computer system, a search of one or more first databases for a first plurality of users matching the one or more search criteria, wherein the first plurality of users do not include the first user;
as a result of the search, identifying, by the computer system, a subset of the first plurality of users, wherein the subset has a number of users less than the first plurality of users;
identifying, by the computer system and from one or more second databases, a second plurality of users that have responded to messages from users in the subset;
aggregating, by the computer system, instances of a plurality of attribute values of an attribute of the second plurality of users to generate a plurality of aggregated values, wherein each aggregated value in the plurality of aggregated values corresponds to a different attribute value of the plurality of attribute values;
based on one or more aggregated values in the plurality of aggregated values, determining, by the computer system, content related to one or more attribute values that correspond to the one or more aggregated values to present to the first user; and
causing, by the computer system, the content to be presented to the first user.

11. The one or more storage media of claim 10, wherein the determining the content comprises:
performing a second search of entities based on the one or more attribute values:
identifying one or more entities that are associated with the one or more attribute values;
wherein the content comprises data about the one or more entities.

12. The one or more storage media of claim 10, wherein the attribute of the second plurality of users is one of a geographic region, an industry, or a seniority level.

13. The one or more storage media of claim 12, wherein the content comprises data about one or more particular geographic regions, one or more particular industries, or one or more particular seniority levels.

14. The one or more storage media of claim 10, wherein the instructions, when executed by the one or more processors, further cause:
for each user in the first plurality of users, storing response data that indicates zero or more users that have responded to one or more first messages from the user and zero or more users that have not responded to one or more second messages from the user;
based on the response data, identifying a third plurality of users that have not responded to messages from one or more users in the subset;
aggregating second attribute values of the attribute of the third plurality of users to generate a second plurality of aggregated values;
wherein the content is also determined based on one or more aggregated values in the second plurality of aggregated values.

15. The one or more storage media of claim 10, wherein the one or more search criteria are specified by the first user.

16. The one or more storage media of claim 15, wherein the instructions, when executed by the one or more processors, further cause:
receiving, from a computing device of the first user, input that comprises one or more keywords;
wherein the performing the search comprises comparing the one or more keywords to data found in user profiles of the first plurality of users.

17. The one or more storage media of claim 10, wherein the instructions, when executed by the one or more processors, further cause, prior to the aggregating the instances of the plurality of attribute values:

identifying a third plurality of users that have received a message from a user in the sub set;

for each user of the third plurality of users, generating an engagement score that reflects how engaged the user is with the user in the subset;

based on the engagement score for each user of the third plurality of users, filtering the third plurality of users to generate the second plurality of users, wherein the second plurality of users is a subset of the third plurality of users.

18. The one or more storage media of claim 10, wherein the instructions, when executed by the one or more processors, further cause, prior to the determining the content:

for each user of one or more users in the second plurality of users:

determining a weight for the user, identifying an attribute value that is associated with the user, generating a weighted instance of the attribute value based on the weight;

wherein at least one aggregated value in the plurality of aggregated values is based on the weighted instance.

19. The one or more storage media of claim 10, wherein the content identifies the one or more attribute values.

20. The one or more storage media of claim 10, wherein the one or more first databases are different than the one or more second databases.

* * * * *